Dec. 10, 1968  G. V. MALMGREN  3,414,937
PRODUCE TRAY PERFORATING MACHINE
Filed Sept. 20, 1965  4 Sheets-Sheet 1
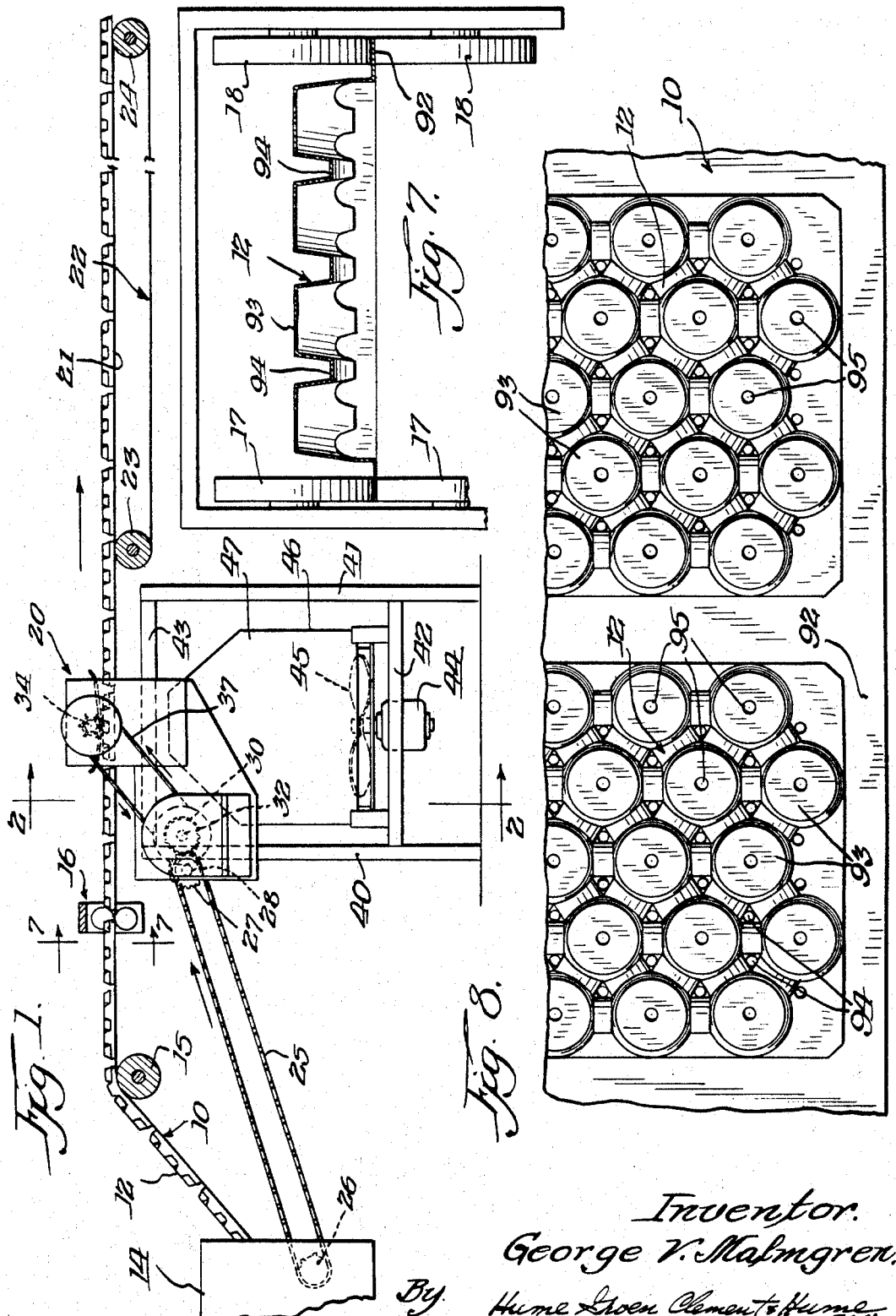
Inventor.
George V. Malmgren,
By Hume Groen Clements Hume
Attys.

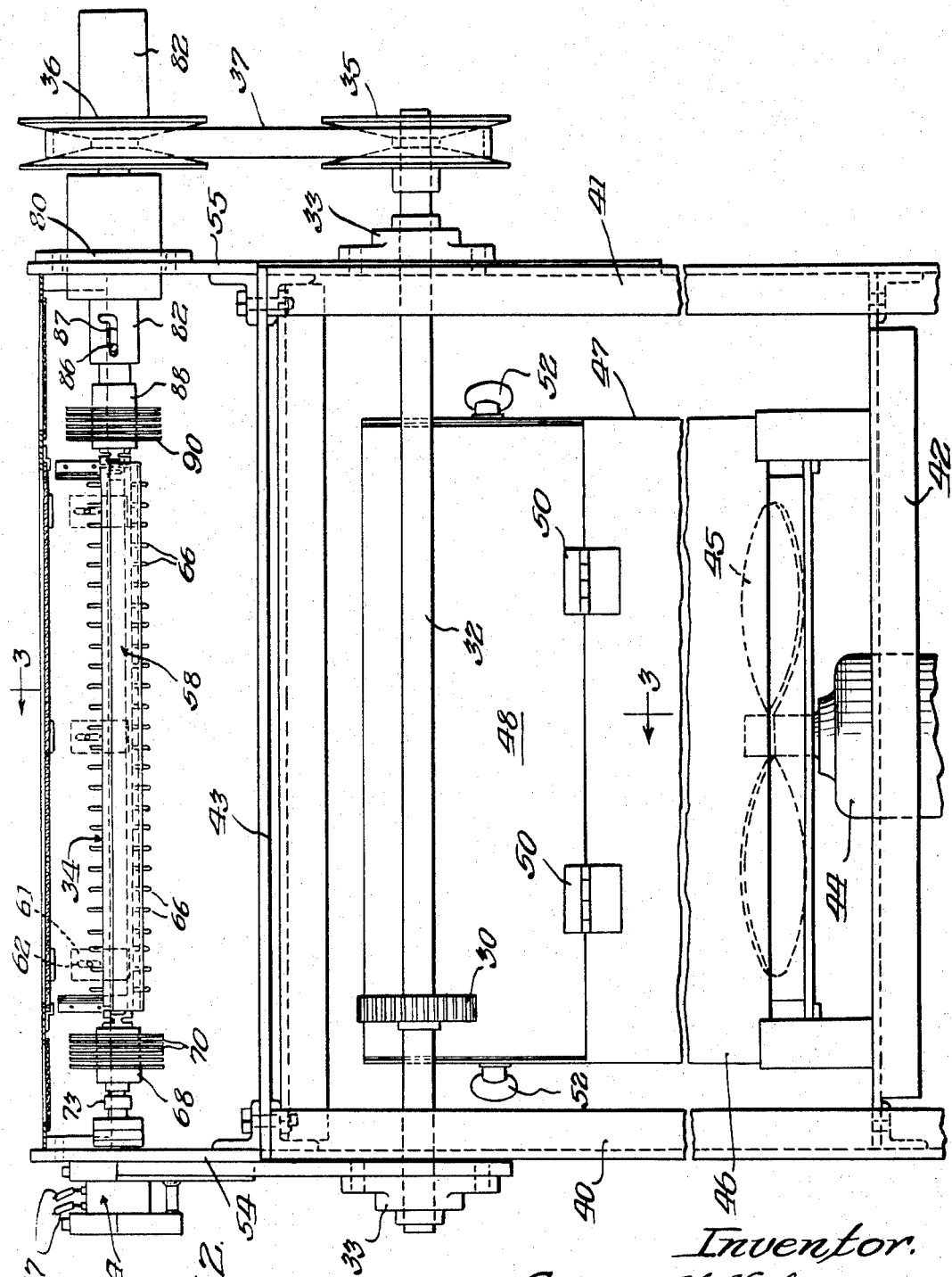

Dec. 10, 1968   G. V. MALMGREN   3,414,937
PRODUCE TRAY PERFORATING MACHINE
Filed Sept. 20, 1965   4 Sheets-Sheet 3
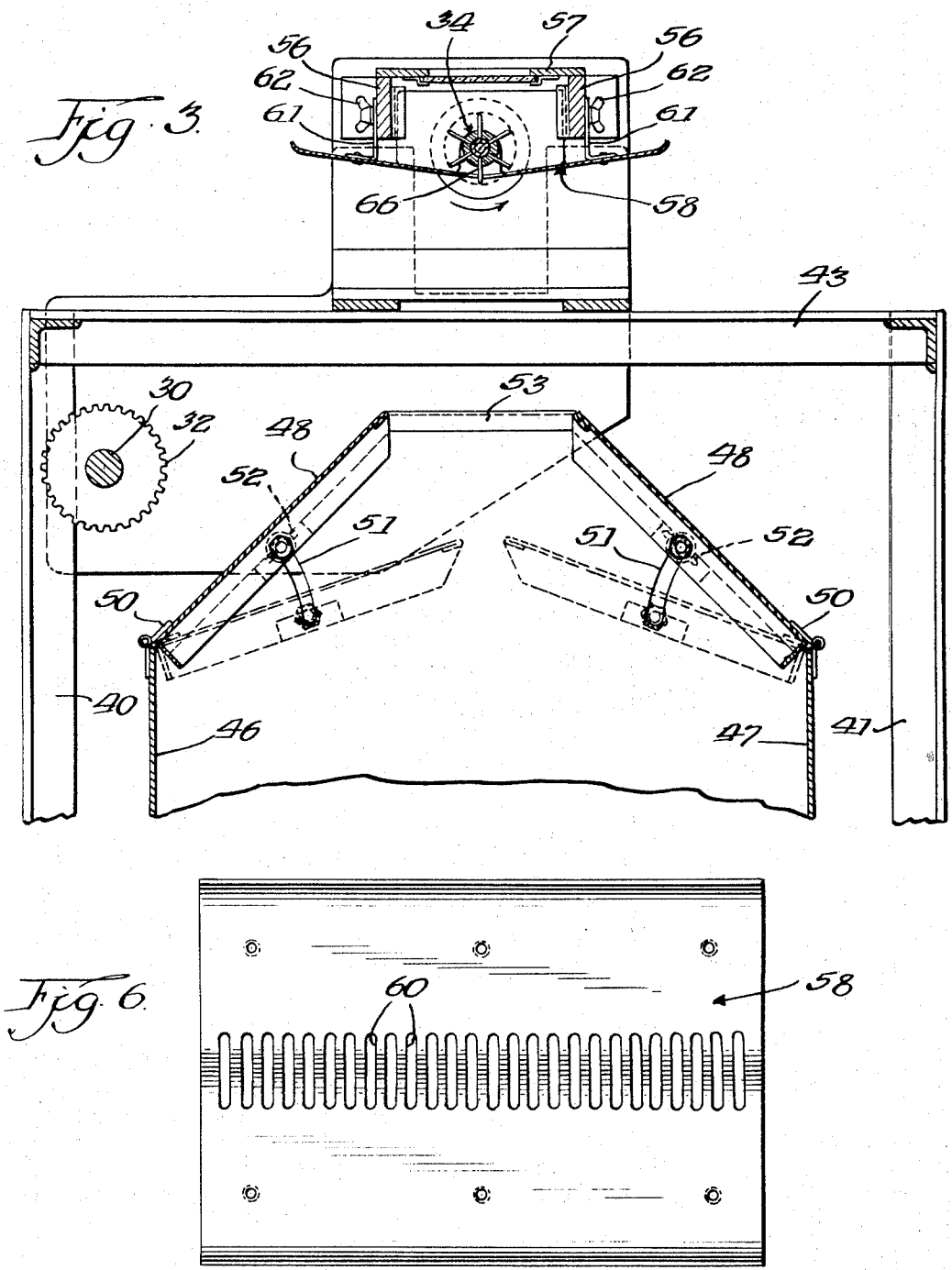
Inventor.
George V. Malmgren.
By Hume Groen Clements Hume
Attys.

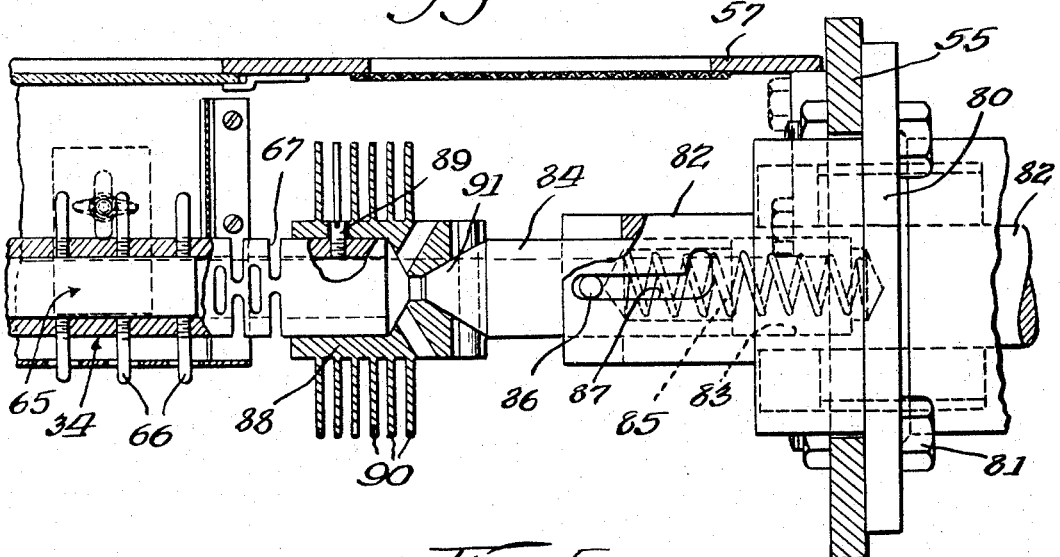
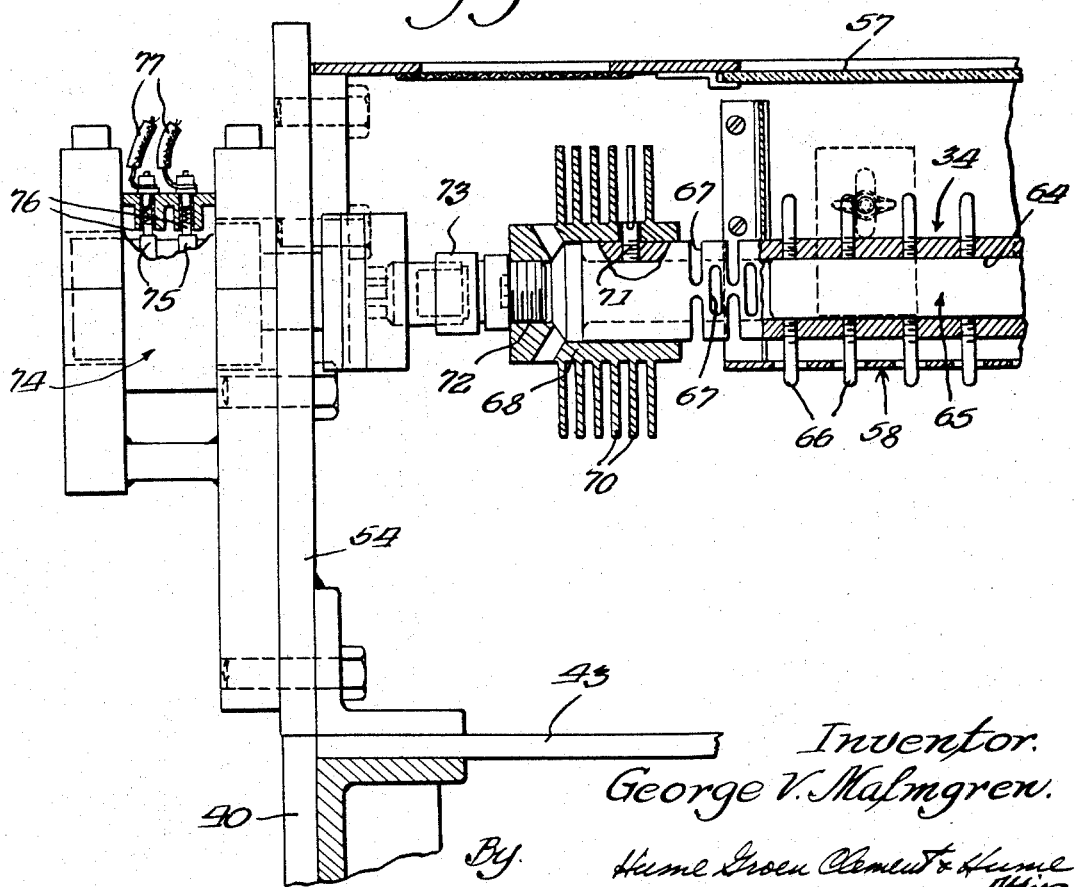

United States Patent Office 3,414,937
Patented Dec. 10, 1968

3,414,937
PRODUCE TRAY PERFORATING MACHINE
George V. Malmgren, Chicago, Ill., assignor to Malanco, Inc., Blue Island, Ill., a corporation of Illinois
Filed Sept. 20, 1965, Ser. No. 488,690
7 Claims. (Cl. 18—1)

ABSTRACT OF THE DISCLOSURE

The perforating machine of the invention is designed to produce holes or perforations in the cavity walls of produce trays such as fruit trays. A perforating drum is journalled for rotation and the drum provides a plurality of heated pins. The heated pins project through openings in a perforated guide plate and which is adjustable in order that the pins may be caused to project the minimum distance in order to reduce the tendency of the pins to burn an elongated hole in the cavity walls. However, if elongated openings are desired, then the perforated guide plate can be set accordingly.

---

The invention relates to apparatus for perforating agricultural produce trays such as fruit trays and the like, and has reference in particular to apparatus for producing holes or perforations in the bottoms of such trays to permit circulation of air around the produce, to permit drainage of condensation which may occur due to changes in temperature or humidity, and to permit drainage of water after the produce laden tray is passed through ice cold water to bring the pit temperature of the fruit normal, thus delaying the ripening process.

The invention accomplishes the objective of perforating the produce trays in a continuous operation, since the web from which the trays have been formed and which still carries the trays is passed through the perforating machine and subjected to the burning action of heated pins forming part of a rotating perforating drum. The bottoms of the cups, or cavities are raised to the level of the rotating pins, and thus an opening is burned in each bottom wall and which may be made substantially round or elongated depending on the relative speed of the pins with respect to the trays.

Another object is to provide a produce tray perforating machine wherein the web containing the trays and from which they have been formed is held in contact with a perforated guide plate by an air flow which maintains the trays in contact with the under surface of the guide plate. Since the heated pins of the rotating perforating drum project beyond the perforated guide plate for a predetermined distance, the desired formation of the openings in the cavity walls of the trays is achieved.

Another object is to provide a perforating machine of the character described wherein the perforating drum may be rotated at a rate so that the velocity of the heated pin tips will match the speed of travel of the trays through the machine and wherein the perforated guide plate is adjustable in a vertical direction to achieve minimum projection of the pins beyond the guide plate so as to reduce the tendency to elongate the holes formed in the bottom of the cavities.

Another objective of the invention resides in the provision of novel and improved apparatus for perforating produce trays and which will embody adjustable drive means for rotating the perforating drum so that the speed of the heated pin tips may be matched or varied with respect to the speed of the trays.

Another object resides in the provision of a perforating drum for a perforating machine wherein the projecting pins are heated electrically by a resistance heater located within and extending axially of the drum.

Another object is to provide a perforating drum for the purposes described wherein cooling fins are formed at each end of the drum in order to prevent excecessive transfer of heat from the enclosed heating unit to the bearings, and wherein provision is also made for removing the drum as a unit from the machine to facilitate repairs or replacement.

With these and various other objects in view, the invention may consist of certain novel features of construction and operation as will be more fully described and particularly pointed out in the specification, drawings, and claims appended thereto.

In the drawings which illustrate an embodiment of the device and wherein like reference characters are used to designate like parts—

FIGURE 1 is a side elevational view illustrating an operative arrangement for the perforating machine of the invention and which shows a web of formed produce trays passing through the machine to be perforated thereby;

FIGURE 2 is a vertical sectional view taken substantially along line 2—2 of FIGURE 1 and showing the perforating machine in front elevation;

FIGURE 3 is a sectional view taken on line 3—3 of FIGURE 2;

FIGURE 4 is a fragmentary sectional view showing details of the mounting for the perforating drum at the right hand end of the same;

FIGURE 5 is a fragmentary sectional view showing details of the mounting and the electrical connections for the perforating drum at the left hand end of the same;

FIGURE 6 is a bottom plan view of the perforated guide plate;

FIGURE 7 is a sectional view taken substantially along line 7—7 of FIGURE 1 and which illustrates the manner of feeding the web of formed produce trays to the perforating machine, and FIGURE 8 is a top plan view showing a produce tray with an opening in the bottom wall of the cups and which has been formed by the machine of the invention.

The invention contemplates that the produce trays will be presented to the perforating machine as a continuous connected web of trays so that by timing the travel of the trays with the rotary speed of the perforating drum, or vice versa, the operations can be made substantially automatic requiring a minimum of attention on the part of the operator. Accordingly the web 10 of formed produce trays 12 from the plastic forming machine 14 are passed over the directing roller 15 and then through the web feeder 16. From the web feeder, the web 10 of the formed trays 12 is passed through the perforating machine 20 and as the web exists from the machine it passes through pull-out rolls and then it is supported by the top run 21 of the endless delivery belt 22 which includes the end rollers 23 and 24.

The formed produce trays are not displaced or removed from the web until the perforating operation has been completed. Thus in order to obtain this mode of operation, the web is fed to the perforating machine 20 at the same speed as the web leaves the plastic forming machine. To accomplish this the directing roll 15 is driven at the required speed from the plastic forming machine or from some other source of power. Likewise the rolls 17 and 18 of the web feeder may be driven at the desired speed from the plastic forming machine or from another source of power. As regards the web feeder, it will be observed from FIGURE 7 that the edges of the web 10 are located within the bite of the rolls 17 and 18 on respective sides of the web in order to insure a positive feeding action. The rolls 23 and 24 of the delivery belt 22 are also driven at a speed conforming to that of the travel of the web.

The mode of operation for the perforating machine also contemplates that the machine be driven from the plastic has meshing relation with gear 30 on shaft 32, the said nalled by the perforating machine. A gear on shaft 28 forming machine and accordingly a chain drive 25 connects a sprocket 26 of the plastic forming machine with a sprocket 27 fixed to shaft 28 which is suitably jour-shaft being journalled by means of the bearings 33, FIGURE 7. Shaft 32 comprises the driving member for the perforating drum 34, the drive including the pulley 35, the adjustable pulley 36 and the endless belt 37. By selecting a spacing for the adjustable pulley 36, the speed of rotation of the perforating drum 34 can be adjusted as desired with respect to the speed of travel of the trays.

FIGURES 2 and 3 show details of the perforating machine and by referring to said figures it will be observed that the framework for the machine includes the standards 40 and 41 which support the bottom cross bars 42 and the top cross bars 43. The cross bars 42 provide a support for the electric motor 44 which has a fan 45 fixed to its drive shaft, the fan facing upwardly and thus directing an air flow in an upward direction towards the perforating drum 34. Within the framework and suitably supported by the same there is provided an enclosure for directing and controlling the air flow to the drum. Said enclosure consists of the side walls 46, the end walls 47 and the adjustable panels 48. The panels are pivotally mounted by the hinges 50 on the side walls 46 and links 51 and wing nuts 52 are provided for regulating the opening and closing of the panels. The air flow from the fan 45 is thus directed through the top opening 53 of the enclosure towards the perforated plate and drum, the constructional details of which will now be described.

Additional framework for journalling the perforating drum 34 is provided by the uprights 54 and 55 which are suitably fixed to the top cross bars 43 and which in effect form a continuation of the standards 40 and 41. Side walls 56 and a top wall 57 complete the housing for the perforating drum. The perforated plate 58, FIGURE 6, having a plurality of slots 60 formed therein and which extend transversely, is suspended from the side walls 56, FIGURE 3, by means of the links 61 and the wing nuts 62. This provides an adjustment for the plate so that it can be raised or lowered as desired by the operator.

The perforating drum 34 essentially consists of a rod having a bore 64 extending substantially from end to end and which bore receives the heater 65. The rod or drum 34 is provided with a plurality of metal pins 66 which are threaded into the drum and which are spaced longitudinally and also circumferentially so as to properly coact with the bottom walls of the cavities of the produce trays passed through the machine. At the left hand end of the drum 34, FIGURE 5, it will be observed that the drum is provided with a number of cooling slots 67. Beyond the slots the terminal end of the drum is adapted to seat in the socket of a hub member 68 having the cooling fins 70 integral therewith. The set screw 71 is employed for releasably fastening the parts. The end of the hub member 68 is bored and threaded at 72 for receiving the threaded end of the connector 73, the said connector operatively connecting the perforating drum with the rotary conductor designated in its entirety by the numeral 74. The rotary conductor is suitably fixed in position exteriorly of the upright 54. By means of slip rings 75 and spring energized contacts 76 the terminals 77 of an electric power source are electrically connected to the heater 65 which, of course, revolves with the perforating drum. It is possible by means of the connector 73 to release the hub member from the rotary conductor, and then by releasing and removing the hub member the perforating drum can be lifted and removed from the machine in the event repairs or replacements are necessary.

FIGURE 4 shows the mounting for the right hand end of the perforating drum. The upright 55 has the bearing assembly 80 fastened thereto by the bolts 81. This bearing assembly journals the shaft 82 to which the adjustable pulley 36 is secured. The interior end of the shaft 82 is cored at 83 for receiving the centering pin 84 and which is backed by the coil spring 85. The pin 86 and slot 87 provide a releasable connection for the centering pin.

The right hand end of the drum 34 is also slotted at 67 for cooling purposes, and a hub member 88 is releasably secured to this end of the drum beyond the slots by the set screw 89. The hub member has the cooling fins 90 formed integral therewith. The end wall of the hub member is provided with a cone shaped cavity which receives the pointed end 91 of the centering pin 84. When disconnecting the perforating drum from the driving shaft 82, it is thus necessary to retract the centering pin 84 against the tension of the coil spring 85, and which is accomplished by the operator by engaging the pin 86. With the centering pin 84 retracted this end of the drum is free. In a similar manner as described with respect to the left hand end, the hub member 88 can now be released and the drum is accordingly free for removal.

During operation of the perforating apparatus as described, the pins 66 are heated by the enclosed heating element 65. Also, it will be understood that the speed of rotation of the drum 34 can be adjusted by a selective spacing of the adjustable pulley 36. The tip velocity of the heated pins 66 can be matched or varied with respect to the speed of travel of the fruit trays. When the tip velocity is matched with the passage of the fruit trays through the machine, the openings burned in the bottom walls of the tray cavities will be substantially round. This mode of operation assumes that the perforated plate 58 is positioned to provide for the minimum projection of the heated pins beyond the slots 60. When it is desired to form elongated slots in the tray bottoms, the tip velocities of the heated pins can be either increased or decreased with respect to the speed of travel of the fruit trays. Also this elongating action of the heated pins can be increased by so adjusting the perforated plate as to allow the pins to project a greater distance below the plate.

During operation it is necessary to maintain the trays in contact with the bottom surface of the perforated plate 58. Since the trays are relatively light and flexible, the invention provides an airflow having its source located directly below the perforated plate and wherein the flow is substantially vertical in an upward direction so as to maintain the bottom wall of the tray cavities up against the perforated plate. This action, of course, takes place in the immediate vicinity of the slots 60 since the heated pins project through the slots and the burning action to form the openings is accomplished at this location. In order that the airflow may be adjusted in intensity the enclosure for the fan 45 is provided with the adjustable panels 48.

FIGURE 8 illustrates a type of fruit tray that can be processed by the perforating machine. The web of plastic material previously identified by the numeral 10 is formed with the trays 12 by a die and vacuum drawing operation. The trays are so located on the web as to leave a marginal flange 92, and each tray essentially consists of a plurality of cups or cavities 93, FIGURE 7, which are separated and spaced from adjacent cups or cavities by the angular shaped portions 94. The bottom of each cup is perforated by the present machine to form an opening 95.

In the burning operation performed by the heated pins as described the plastic material of the trays is seared and this action in forming the openings 95 builds up a bead around the periphery of the opening. Such a bead is desirable due to the resulting smoothness of the edge of the opening, and further the bead adds strength to the plastic material surrounding the opening.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In a perforating machine of the character described, in combination, a perforating drum journalled by the machine, said drum providing a plurality of projecting pins which are spaced longitudinally and circumferentially on the periphery of the drum, a perforated guide plate located below the perforating drum and having a plurality of slots through which the pins project, means for rotating the drum, and means located below the perforated plate for producing an air flow in an upward direction towards the said plate.

2. In a perforating machine, the combination with means for feeding a continuous web of formed produce trays to the machine, of a perforating drum journalled by the machine, said drum providing a plurality of projecting pins which are spaced longitudinally and circumferentially on the periphery of the drum, means for heating the pins, a perforated guide plate located below the perforating drum and having a plurality of slots through which the pins project, means for rotating the drum in a predetermined timed relation to the feeding of the produce trays through the machine, said produce trays in passing through the machine being located below and in contact with the perforated plate, and means producing an air flow for maintaining the trays in contact with the undersurface of the perforated plate as the trays pass through the machine.

3. A perforating machine of the character as defined by claim 2, wherein the means producing the air flow includes an electric fan located below the perforated plate.

4. A perforating machine of the character as defined by claim 2, wherein the means for heating the pins includes a heating element of the electrical resistance type and which extends longitudinally within the perforating drum.

5. In a perforating machine, the combination with means for feeding a continuous web of formed produce trays to the machine, of a perforating drum, means journalling the perforating drum including a shaft journalled by the machine and providing a spring energized centering pin for contact with one end of the drum, a rotary connector supported by the machine and providing a releasable connector for engaging the other end of the drum, a plurality of projecting pins on the drum spaced longitudinally and circumferentially, means for heating the pins, a perforated guide plate located below the perforating drum and having a plurality of slots through which the pins project, means for rotating the drum in a predetermined timed relation to the feeding of the produce trays through the machine, said trays in passing through the machine being located below and in contact with the perforated plate, and means for producing an air flow for maintaining the trays in contact with the undersurface of the perforated plate as the trays pass through the machine.

6. A perforating machine of the character as defined by claim 5, wherein the means for heating the pins includes a heating element of the electrical resistance type and which extends longitudinally within the perforating drum.

7. A perforating machine of the character as defined by claim 5, wherein the means for heating the pins includes a heating element of the electrical resistance type located within the drum, and wherein the rotary connector electrically connects the heating element with a source of power exteriorly of the machine.

References Cited

UNITED STATES PATENTS

| | | | |
|---|---|---|---|
| 901,892 | 10/1908 | Davidson | 83—349 XR |
| 1,306,283 | 6/1919 | Shaw | 83—349 XR |
| 2,275,612 | 3/1942 | Chandler | 264 |
| 2,724,216 | 11/1955 | Cisno | 18 |
| 2,748,863 | 6/1956 | Benton | 18 |
| 2,924,863 | 2/1960 | Chavannes | 264 |
| 3,160,687 | 12/1964 | Andrews | 264 |
| 3,187,380 | 6/1965 | Harrison | 18—1 |

WILLIAM J. STEPHENSON, *Primary Examiner.*

U.S. Cl. X.R.

83—660, 171

UNITED STATES PATENT OFFICE
CERTIFICATE OF CORRECTION

Patent No. 3,414,937                                                                       December 10, 1968

George V. Malmgren

It is certified that error appears in the above identified patent and that said Letters Patent are hereby corrected as shown below:

Column 3, line 3, beginning with "has meshing" cancel all to and including "jour-" in line 7, same column 3, and insert -- forming machine and accordingly a chain drive 25 connects a sprocket 26 of the plastic forming machine with a sprocket 27 fixed to shaft 28 which is suitably journalled by the perforating machine. A gear on shaft 28 has meshing relation with gear 30 on shaft 32, the said --.

Signed and sealed this 10th day of March 1970.

(SEAL)
Attest:

Edward M. Fletcher, Jr.                                     WILLIAM E. SCHUYLER, JR.
Attesting Officer                                                       Commissioner of Patents